No. 832,207. PATENTED OCT. 2, 1906.
J. R. PEIRCE.
MACHINE FOR MAKING MOSAICS AND THE LIKE.
APPLICATION FILED SEPT. 22, 1905.
5 SHEETS—SHEET 1.
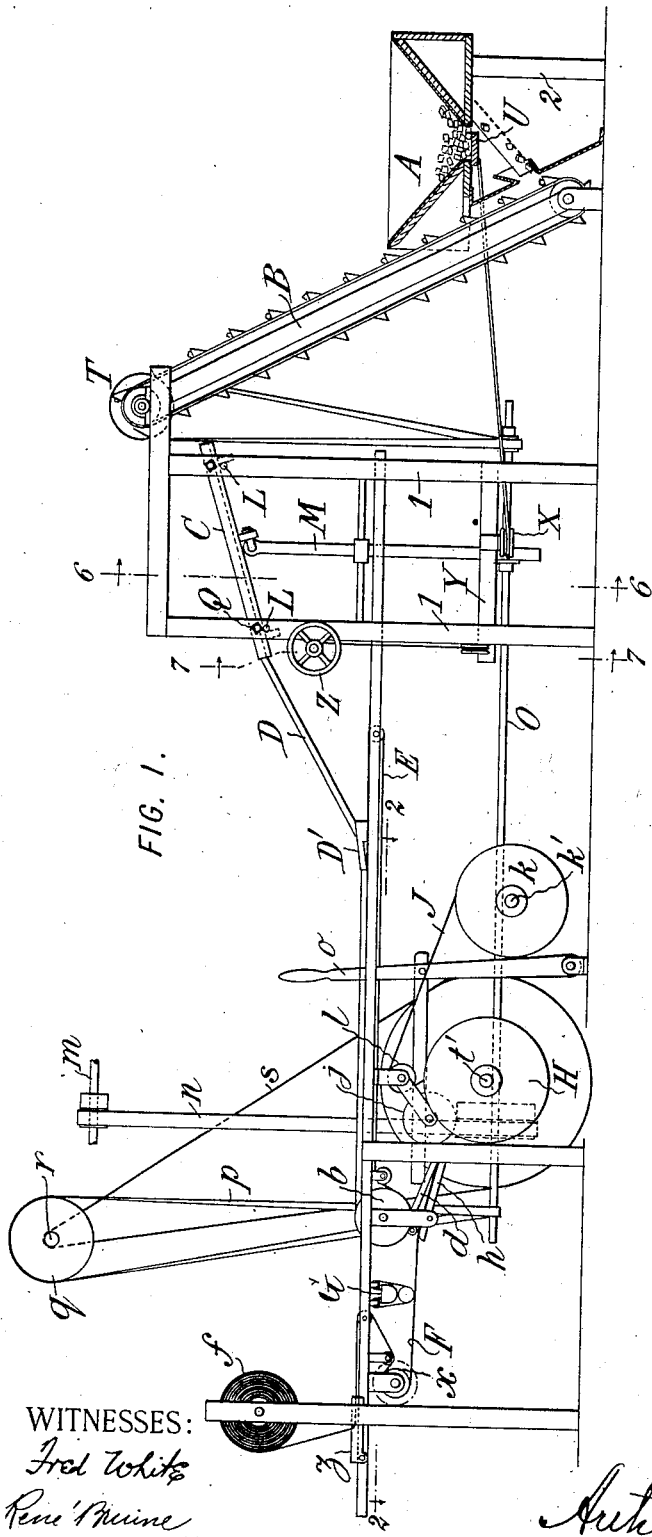
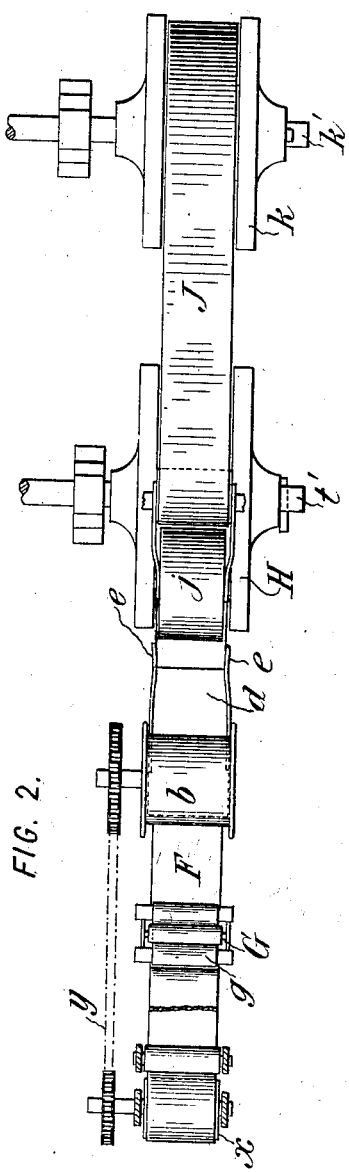
INVENTOR
John Hoyden Peirce,
By Attorneys,
WITNESSES:

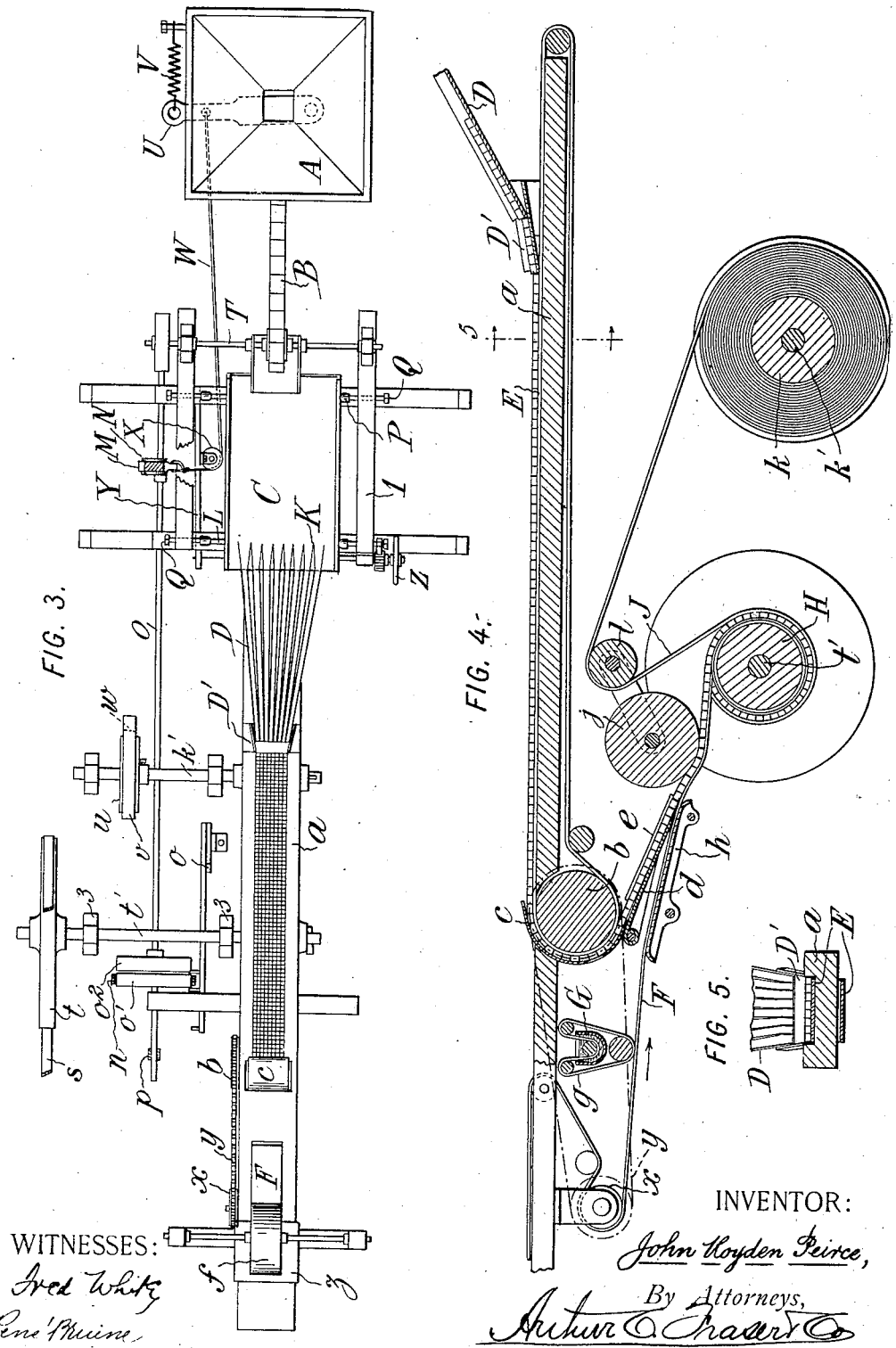

No. 832,207. PATENTED OCT. 2, 1906.
J. R. PEIRCE.
MACHINE FOR MAKING MOSAICS AND THE LIKE.
APPLICATION FILED SEPT. 22, 1905.
5 SHEETS—SHEET 3.
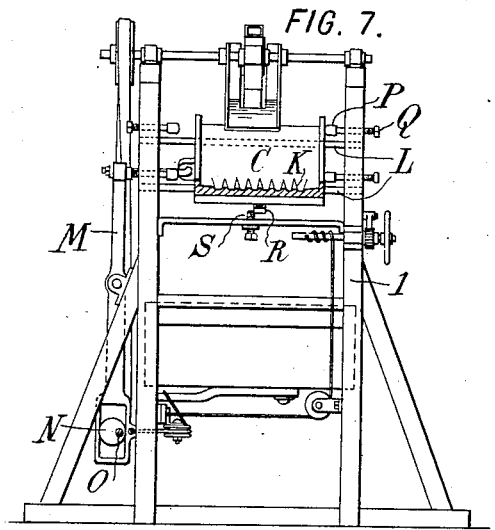
FIG. 7.
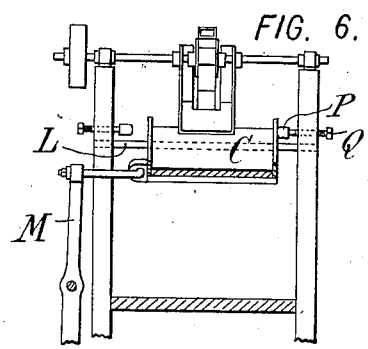
FIG. 6.
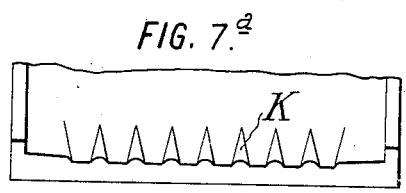
FIG. 7.ª
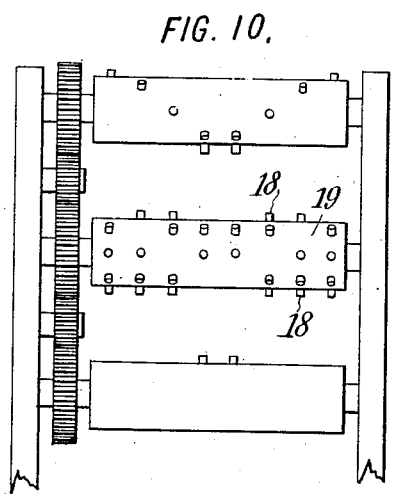
FIG. 10.
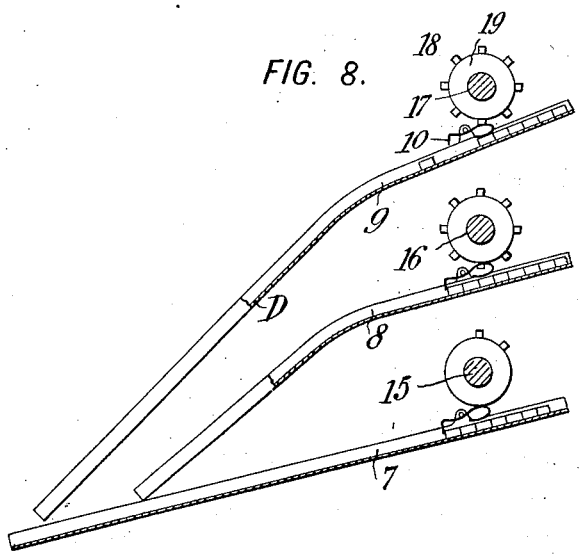
FIG. 8.
FIG. 9.
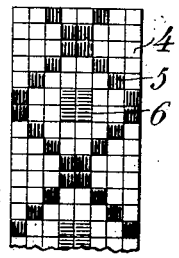
FIG. 11.
WITNESSES:
Fred White
René Thuine
INVENTOR:
John Royden Peirce,
By Attorneys,
Arthur E. Frasier Co.
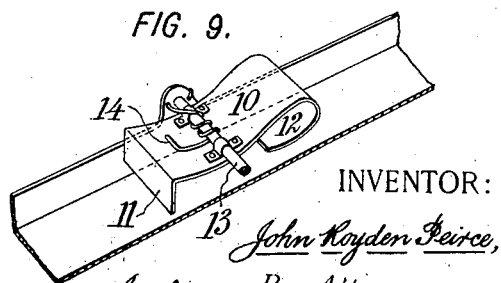

No. 832,207. PATENTED OCT. 2, 1906.
J. R. PEIRCE.
MACHINE FOR MAKING MOSAICS AND THE LIKE.
APPLICATION FILED SEPT. 22, 1905.

5 SHEETS—SHEET 4.

WITNESSES:

INVENTOR:
John Hoyden Peirce,
By Attorneys,

No. 832,207. PATENTED OCT. 2, 1906.
J. R. PEIRCE.
MACHINE FOR MAKING MOSAICS AND THE LIKE.
APPLICATION FILED SEPT. 22, 1905.

5 SHEETS—SHEET 5.

WITNESSES:

INVENTOR:
John Hoyden Peirce,
By Attorneys, ized generically

UNITED STATES PATENT OFFICE.

JOHN ROYDEN PEIRCE, OF NEW YORK, N. Y.

MACHINE FOR MAKING MOSAICS AND THE LIKE.

No. 832,207.

Specification of Letters Patent.

Patented Oct. 2, 1906.

Application filed September 22, 1905. Serial No. 279,600.

*To all whom it may concern:*

Be it known that I, JOHN ROYDEN PEIRCE, a citizen of the United States, residing in the borough of Manhattan, city, county, and State of New York, have invented certain new and useful Improvements in Machines for Making Mosaics and the Like, of which the following is a specification.

This invention aims to provide a machine for assembling blocks of marble, "ceramic," or similar materials, such as are used in making floors. The blocks, of whatever material or size and all of which I designate generically as "mosaic," are fed in successive transverse rows or in adjacent longitudinal lines, preferably a fabric in the form of a long narrow strip, which fabric serves as a holder for the assembled blocks, so that they may be transported and handled as a unit in convenient lengths and applied as a unit to the cement or other foundation of the floor, the fabric being removed after the blocks are laid in place. By the use of the machine described the sections of assembled blocks can be made of practically any size and with great rapidity, and the laying of the floor from such large sections can be accomplished much more rapidly than by present hand processes. Also the blocks may be assembled directly on the floor.

The accompanying drawings illustrate machines embodying the invention.

Figure 12:
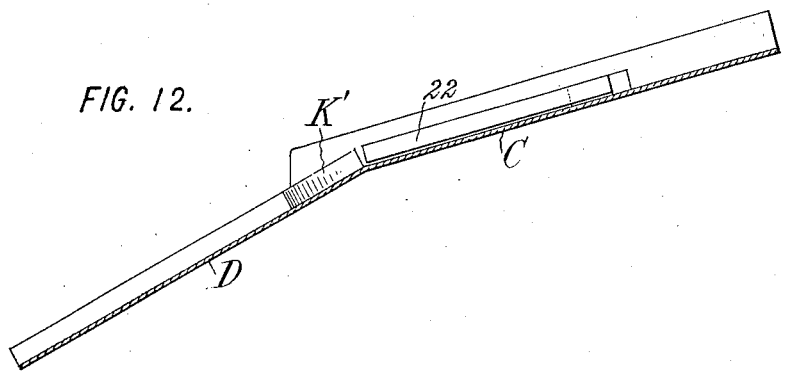
Figure 13:
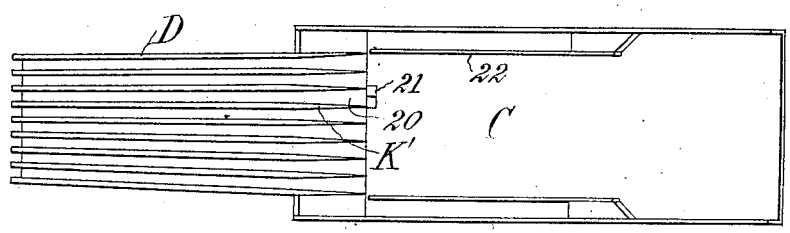
Figure 14:
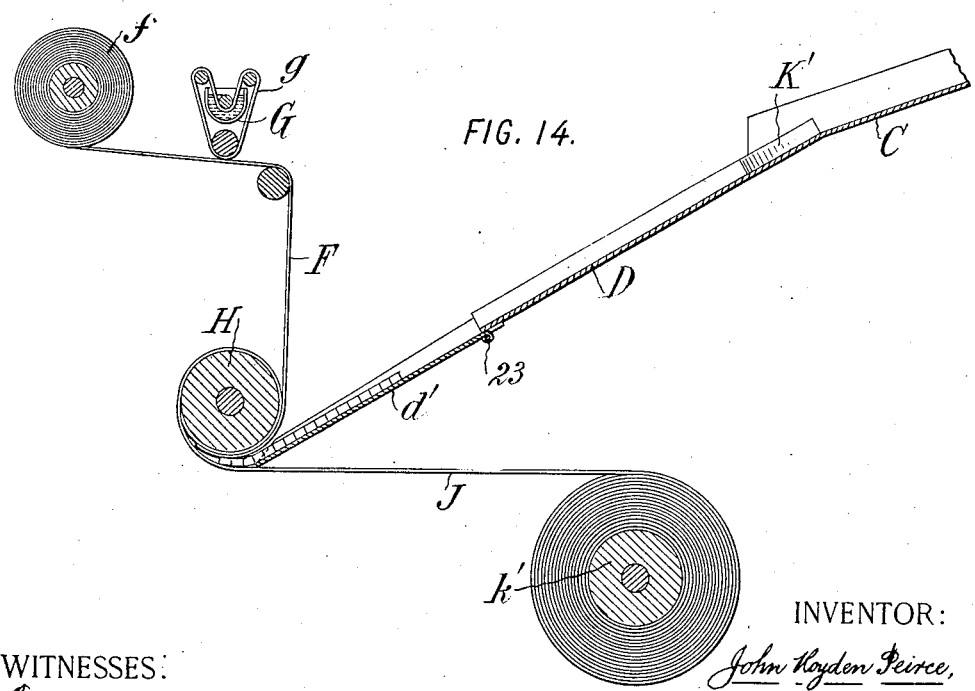
Figure 15:
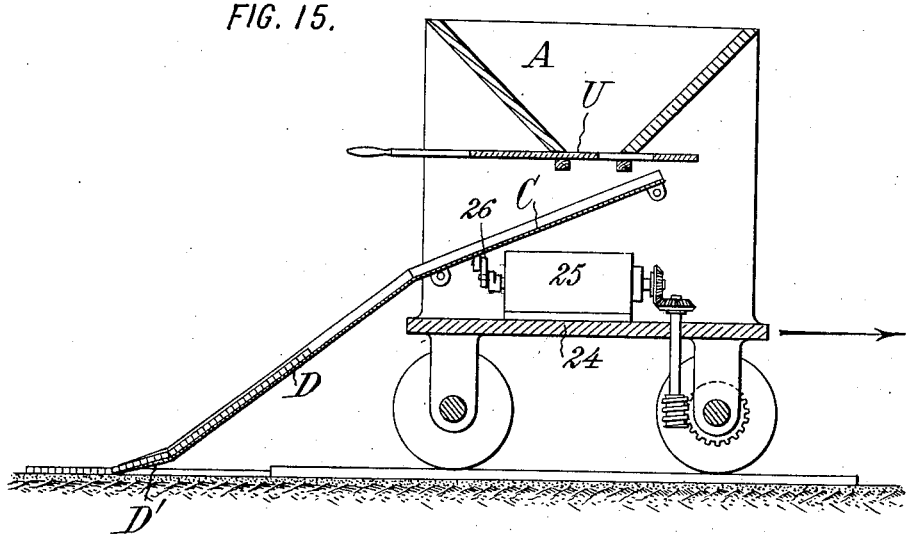
Figure 16:
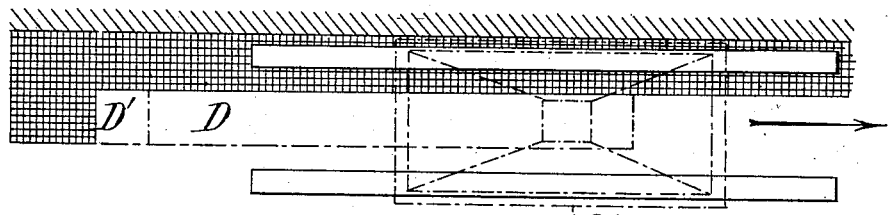
Figure 17:
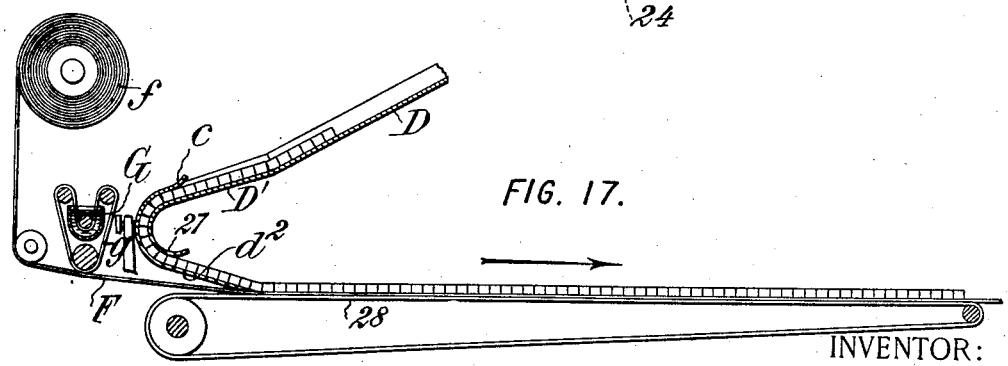

Figure 1 is a side elevation. Fig. 2 is a plan of the lower portion of the machine approximately on the line 2-2 of Fig. 1. Fig. 3 is a plan of the complete machine. Fig. 4 is a longitudinal section of one end of the machine. Fig. 5 is a cross-section on the line 5 5 of Fig. 4. Figs. 6 and 7 are respectively cross-sections on the lines 6 6 and 7 7 of Fig. 1. Figs. 8, 9, 10, and 11 illustrate the making of mosaics of contrasting blocks so as to form a desired pattern. Fig. 8 is a vertical section showing chutes carrying blocks of different colors. Fig. 9 is a perspective view of an escapement device. Fig. 10 is a front elevation of the operating-drums of Fig. 8. Fig. 11 illustrates a pattern formed by the drums of Fig. 10. Figs. 12 and 13 are a longitudinal section and a plan of a detail; and Figs. 14 and 17 are assembled views, in longitudinal section, illustrating a different construction. Figs. 15 and 16 are a longitudinal section and a plan, respectively, illustrating the laying of the blocks directly on the floor.

Referring to the embodiments of the invention illustrated, the blocks are taken from a hopper A by means of a conveyer or elevator B to an inclined tray C and thence are fed into a number of chutes D, from the lower ends of which they emerge in continuous and adjacent lines and are carried forward on a conveyer or belt E, Fig. 4. From the individual chutes D they first run upon a spout D', where the separate lines are assembled, and they are then forced by the weight of blocks above onto the conveyer E. The blocks are somewhat loosely arranged on the belt and are exposed, so that the operator can inspect them for removing blocks which are defective in shape or color or for setting right side up blocks which have only one face— that is to say, one surface which can form the surface of the finished floor. A strip of paper or similar fabric F is drawn continuously from a roll f and is coated with glue or other adhesive from a pot G. The blocks are inverted at the end of the conveyer or belt E and are brought with their faces upon the adhesive face of the fabric F. The compound strip is then carried forward and wound upon a roller H. In order to carry the blocks around the roller H and at the same time to hold the blocks upon the fabric until they have perfectly adhered thereto, a strip of felt or canvas J is wound around with the compound fabric, pressing against the exposed backs of the blocks.

When the section of desired length has been rolled on the roller H, it may be unwound therefrom, at the same time removing the felt or canvas. The paper strip, with the blocks thereon, is then transported to the place of use, where it may be inverted upon the cement or other foundation and quickly adjusted into place, after which the paper may be removed by wetting it. For convenience in transporting the compound strip it may be wound on a second roll as the felt or canvas is withdrawn.

Each of the chutes D is substantially the width of one block, leaving only sufficient play to permit a block to slide down freely. The chutes are close to each other at their lower ends, but are spread apart at their upper ends to facilitate the entrance of the blocks thereinto. Considerable difficulty has been found in avoiding the jamming of the blocks at the mouths of the chutes. This difficulty has been minimized by separating the mouths, as explained, and by providing between the mouths of each two adjacent chutes a triangular guide K, which is tapered downward at the sides, as indicated in Fig. 7ª. When two blocks attempt to enter the mouth of the same chute at the same time, one of them will be gradually forced up the tapered side of the adjacent guide K and out of the way, permitting the other to pass free and clear into the chute.

The chutes D are mounted so as to permit a slight movement at the points of connection of their upper and lower ends with the tray and with the lower conveyer E, respectively, so as to permit a lateral shaking or jogging of the tray C. The blocks are dumped in all positions on the tray, and means are provided for shaking the tray laterally and preferably, also, for bumping it up and down, each of these movements being comparatively slight in amplitude, but sudden. The result is the throwing down of such blocks as originally stood on edge and the gradual feeding of the blocks down the inclined tray. The floor of the tray is unobstructed, so as to permit these operations. It is preferable that the tray shall not be steeply inclined, so as to exert a considerable pressure from the blocks therein upon those which are entering the mouths of the chutes or are within the chutes, and the shaking and bumping movements referred to feed the blocks forward with very little pressure from the blocks behind them.

Various mechanical arrangements may be provided for securing the movements described. In Figs. 6 and 7 means are illustrated for this purpose. The tray C is supported and guided upon a pair of cross-rods L and is connected to a lever M, which is oscillated by an eccentric N on a continuously-rotating shaft O, running alongside of the machine. Rubber or spring buffers P are arranged at the sides, being mounted on the ends of adjustable bolts Q. As the tray is thrown to one side or the other by the swinging of the lever M it strikes at the end of its throw against the buffers P, which give it a sudden bump or return. In the middle of its transverse movement a projection R, Fig. 7, on the under side of its front edge strikes an adjustable projection S upon a suitable fixed portion of the frame and rides over said projection, thus giving a slight vertical bump to the tray and contents. The action is quick, so that the tray is practically in a constant state of agitation vertically and laterally.

The blocks are brought to the tray C and dumped therein by means of a bucket elevator or conveyer B. The upper shaft T of the conveyer is mounted upon the frame which carries the tray and is driven by a belt and pulley on the shaft O. The lower end of the conveyer is mounted under the hopper A, and the latter is provided with a gate U, swinging horizontally. The free end of the gate U is connected to a spring V, pulling it in the closing direction, while a cord W runs to the lower end of the lever M to pull the gate in the opening direction as the lower end of the lever M swings outward. In order to feed the blocks to the tray in exactly the quantity desired, so as to neither overflow nor run short, the amount of opening of the gate is adjustable by a take-up inserted in the cord W. In the illustration shown a roller X engages the bight of the cord W and is carried upon a lever Y, the free end of which is connected to an adjusting-wheel Z at the opposite side of the machine. For a given position of the gate-operating lever M the gate will be more or less open as the roller X is a greater or less distance from the operating-lever.

From the lower end of the individual chutes D the blocks are assembled upon a belt running over a platform or support a, along which they are conveyed by the belt E. It will be seen that the blocks are exposed in the tray and in the individual chutes, so that the operator may there correct any imperfections. It is preferable, however, to do this upon a substantially horizontal support, where the blocks may be arranged with a slight degree of looseness and will not press against each other, and for this purpose the support a may be made of sufficient length to give ample time for the correction of imperfections, the length, of course, depending upon the speed of operation. After being exposed for inspection upon the support a the blocks are applied to the paper strip with their faces against the adherent side of the strip. In the machine shown in Figs. 1 to 7 this is accomplished by inverting the blocks at the end of the support. The belt E travels at its discharge end over a roller b, and a hood c is provided, fitting close enough to the faces of the blocks to hold them in place. At the lower end of the hood is a pivoted chute or tray d, the lower end of which rests upon or directly above the paper, so as to fit the now inverted blocks upon the paper. The pivotal arrangement permits the lower end of the tray to move as the size of the roll upon the roller H varies, so that the feed from the free end of the tray shall always be approximately tangential. The blocks being fed in a somewhat loose condition to the chute d are lightly packed together thereon in the longitudinal direction by the weight of the blocks and in the transverse direction by a pair of flat springs e, Fig. 2.

The strip of paper F is drawn from a roll f and after passing over suitable tension-rollers receives a coat of adhesive from the pot G, an endless band g being arranged to run through the liquid adhesive and over the face of the paper F. The paper may be supported upon an apron h adjacent to the point where it receives the blocks. If the composite strip is wound upon the roller H, it takes an arched form, with the paper on the inside, which creates difficulties when it is attempted to draw it off the roll in a straight line. Therefore it is preferable to run it first under a supplementary roll $j$, which bends it in the opposite direction and, in effect, spreads the blocks slightly upon the adherent face of the paper. Thereafter when the composite strip is wound on the main roll H it is wound with the blocks spaced from each other slightly, but to such an extent as to permit the easy unrolling of the composite strip in a straight line after the blocks become fixed on the paper. The felt or canvas J, which is wound on the roll H with the composite strip, is drawn from a roller $k$ and over a guide-roller $l$ to engage the blocks at or near the top of the roller H.

Various arrangements may be adopted for driving the several parts of the mechanism. In the machine shown the power is taken from an overhead shaft $m$. From this shaft a belt $n$ drives the shaft O, which operates the mechanism at the right-hand end of the machine in Figs. 1 and 3. A shifting-lever $o$ shifts the belt $n$ from a fast to a loose pulley $o'$ $o^2$ on the shaft O, as desired. The shaft O in turn is used for driving at a much reduced rate the winding-drum or roller H. Power is transmitted by means of a belt $p$ running to a large drum $q$ on the same shaft with a small drum $r$, which drives the belt $s$, which rotates a large pulley $t$ on the shaft $t'$ of the winding-drum. The drum or roller $k$, which carries the supply of felt, is a tension-roller. Its shaft $k'$ is provided with a brake-wheel $u$, upon which is a brake-band $v$, fastened at one end and provided with a weight $w$ at the opposite end. To secure a uniform fit of the paper and the blocks, a rubber roller $x$ is rotated by the paper F as the latter is drawn forward by the drum H. A sprocket-chain $y$ transmits the rotation of the roller $x$ to the roller $b$, the sprockets and the rollers being suitably proportioned to give the desired uniformity of movement. The drum $b$, it will be understood, carries with it the conveyer E. A tension device $z$ consists simply of a pivoted weight resting on the paper. Preferably the driving mechanisms are all arranged upon one side of the machine, (see Fig. 3,) leaving the other side freely accessible to the operator, so as to permit inspection of the work at all times and correction of it in the manner explained. The operator of course will stand on the side opposite the mechanism. Any suitable arrangement of the main frames or supports of the several elements of the machine may be adopted. In the illustration shown there are three main supports—a frame 1 carrying the tray and operating mechanism therefor and carrying the adjacent ends of the chutes D and elevator B, a separate simple set of legs or supports 2 for the hopper and lower end of the elevator, and a third table, being the platform $a$, extended to carry the adhesive pot and the tension device and adjacent parts for the paper, the platform $a$ being supported by legs, as illustrated. The drums or rollers H and $k$ are carried in separate sets of standards 3 at the mechanism side of the machine.

For making special patterns with blocks of different colors or otherwise varying from each other the blocks may be exposed on the horizontal table and subsequently applied to the fabric by the same mechanism as shown at the left of Figs. 1 and 3. They may also be supplied to trays, one for each color and one above another, each tray and the supply mechanism being similar to that shown at the right of these figures. With these parts of the machine as described it is only necessary to modify slightly the mechanism for conducting the blocks from the trays to the horizontal support. From each of the trays the blocks are fed in continuous lines to chutes or similar devices for passing them to the horizontal table. Taking a set of these chutes in one vertical plane, blocks will be fed alternately from one or the other of the chutes by escapement devices, so that in the line of assembled blocks corresponding to the chutes in this vertical plane the blocks will be arranged in a determined order. Thus the order of arrangement of the blocks for each of the lines being determined, the entire pattern is controllable at will.

Referring to the mechanism of Figs. 8, 9, and 10 and the example of Fig. 11, we suppose it to be desired to make a section of the width of eight blocks and composed of white blocks 4, blue blocks 5, and red blocks 6. Chutes 7, 8, and 9 will be provided, each fed by a separate tray or equivalent device and carrying, respectively, red, white, and blue blocks. Upon the walls of each tray is mounted an escapement device 10, having a stop 11 at its front end and a spring or friction stop 12 at its rear end, the whole being provided on a shaft 13 and having a spring 14, which presses its forward end down to hold back the line of blocks above. Above each of the escapements 10 is a shaft 15, 16, and 17, respectively, carrying trips for operating the escapements at desired intervals. The trips are preferably pins or tappets 18, carried on drums 19 on the several shafts. Taking a series of pins 18 in a vertical plane—as, for example, the plane immediately at the left of the center—it will be seen that there are pins in one or another of the three drums for every one of the eight points into which the circumference is divided, but no two pins for the same point. Therefore for each angular position of the several shafts—and it is to be understood that they rotate synchronously—one of the escapements will be released by a pin 18, pressing on the rear or spring end of the escapement 10, holding down the second block in the line and lifting the stop 11, so as to permit the escape of the first block, which runs quickly down until it strikes the rearmost block of those which are already assembled. By varying the positions of the pins 18 on the drums 19 the pattern can be indefinitely varied.

The speed of the machine in practice is limited only by the capacity of the operator to correct the inaccuracies as the blocks are fed along. The laying of the assembled sections can be accomplished very much faster than by the present method, which consists generally in throwing the blocks on the floor loosely and then by hand shoving them into place two or three at a time and simultaneously throwing out or turning over imperfect ones. Special patterns of colored blocks are usually made by laying the blocks one by one upon a strip of adhesive paper in sections two or three feet long and then transporting them to the job and laying them as a unit. The making of these units in the shop requires skilled labor and considerable time.

The composite strips or units may be made by the machine of this invention in any desired length to suit the floor to be laid. Instead of forming a roll of the composite strip upon the drum it may be fed out upon a flat table and cut into sections of suitable length, thus avoiding the necessity of unrolling it and removing the felt. (See Fig. 17, hereinafter described.)

For making straight-line borders—that is to say, borders or patterns of differently-colored blocks in which the lines of one color run all in a lengthwise direction—it is not necessary to use escapement devices, but only to feed blocks of desired colors into the chutes D of Fig. 3, each chute carrying blocks of only one color. The escapement device of Fig. 9 may also be used to lay a plain "field" with a small figure at long intervals, as is desirable to break the monotony of a large blank space. For this purpose the set of chutes carrying the field-blocks would alone be operated for a considerable distance, and the chutes containing the supplementary colors would be brought into operation only at desired intervals. In making keramic tile operator would have to turn the finished or face sides of the blocks up, and preferably the canvas conveyer E illustrated would be replaced by a belt having depressions into which the blocks would fit, thus automatically breaking joints, as is usual in this class of work.

By a long series of experiments I have found that the tendency of the blocks to wedge in the chutes D may be corrected by flaring the mouth of each chute to a width equal to a little less than twice the width of a block. With this arrangement when two blocks strike the mouth of a chute simultaneously one is held back and the other runs freely into and through the chute. The construction is illustrated in Figs. 12 and 13, in which the chutes D are provided with flaring mouths 20 of slightly less width than the two blocks 21 placed side by side. In this arrangement the intermediate walls or guides K′ may be, and preferably are, made of uniform height throughout their length instead of being tapered, as illustrated in Figs. 7 and 7ª. The tray C is preferably provided with a spring 22 at each side, which springs throw the blocks constantly toward the center and correct the tendency to collect in the corners.

It is not essential that the intermediate support a and carrier E shall be interposed between the chutes and the roll upon which the composite fabric is wound. A much simpler machine may be made by cutting out all the structure and mechanism between the lower end of the chutes and the roller. For example, as shown in Fig. 14, the blocks may pass down the chutes to the roller H, there being only a tray d′ between the lower ends of the chutes and the roller. This tray receives the blocks directly from the lower end of the chutes and in a loose condition and compacts them in the same manner as the tray d of Fig. 4. The tray is preferably pivoted at 23 to permit its lower end to move outward as the size of the roll of composite fabric upon the roller H increases. The paper F passes from the roll f, past the glue-pot G, and thence directly to the final roller H. The felt passes directly from the roller K′ to the roll H.

The applying of the blocks to a continuous fabric is not essential to the invention. The blocks may, for example, be applied directly upon the floor. For this purpose the apparatus will be mounted on wheels. For example, as shown in Figs. 15 and 16, a truck 24 may carry a motor 25, which drives the truck slowly in the direction of the arrow and which at the same time by means of a crank connection 26 joggles the tray C and keeps the chutes D supplied with blocks, which run down into a tray D′, which receives them loosely and compacts them and feeds them out to the rear as the apparatus moves forward. The truck carries a hopper A with a valve U, which may be operated automatically or by hand by an attendant who works alongside of the apparatus. Fig. 16 illustrates a floor upon which one complete line of mosaic has been laid adjacent to the wall and the next line is being laid by the machine. The machine illustrated is not constructed to work in corners or along the margins of walls, though it might obviously be modified to feed at the side instead of at the center, as shown.

This specific machine is not claimed herein; but it is not to be understood that I thereby waive my right to claim the same in a separate application.

In order to form a composite fabric in straight lengths instead of upon a roll, the paper and the blocks may be fed upon a long endless belt in the manner indicated in Fig. 17. The blocks come down chutes D, as before described, into a tray D', the chutes and tray being of sufficient length to permit the removal of defective blocks. The blocks are then inverted by forming a properly-curved end 27 upon the tray D' and by arranging an adjustable hood c, as in Fig. 1, the hood terminating in a chute or apron $d^2$, which serves the same purpose as the apron $d$ in Fig. 1. The paper is fed below the lower end of the chute $d^2$ and receives the blocks directly upon its adhesive face, and from this point the composite fabric is carried along on an endless belt 28 and cut off in suitable lengths. The inversion of the blocks serves the double purpose of exposing for inspection in the tray D' those faces of the blocks which are to form the surface of the floor and of passing the finished fabric in a backward direction under the mechanism for feeding the blocks, thus compacting the machine considerably. The weight of the blocks is sufficient to cause them to adhere to the paper and to give the latter a good grip upon the belt. The blocks of course may be of any suitable shape, circular or polygonal.

This specific mechanism for forming the fabric in straight lengths is not claimed in the present application, it being understood, however, that I do not thereby waive my right to claim the same in a separate application.

The lines of blocks are in substantial contact with each other—that is to say, for ordinary mosaic with rough side faces the contact is at separate points, so as to leave the usual space for cement between adjacent blocks, while for regularly-molded blocks, as so-called "ceramic," there would be a slight space, a sixteenth of an inch maximum, for the cement; but there would be no dividing-partitions or the like between the blocks as they are fed out of the machine.

Though I have described with great particularity of detail certain embodiments of the invention, yet it is not to be understood that the invention is limited to the specific embodiments disclosed.

Various modifications thereof in detail and in the arrangement and combination of the parts may be made by those skilled in the art without departure from the invention.

What I claim is—

1. A mosaic-machine including mechanism for feeding a number of blocks simultaneously in continuous and substantially contacting lines.

2. A mosaic-machine including in combination a number of inclined chutes side by side, each of substantially the width of one block, and means for feeding blocks through the several chutes simultaneously to form substantially contacting lines of blocks.

3. Means for feeding a number of blocks simultaneously in a transverse row, and applying a number of successive rows to a fabric, with the faces of the blocks in contact with the fabric, whereby a number of blocks may be laid at once and the fabric may be withdrawn after the blocks are laid.

4. Mechanism for feeding a number of blocks simultaneously in adjacent lines, and means for applying said lines of blocks to a fabric, with the faces of the blocks in contact with the fabric, whereby a number of blocks may be laid at once and the fabric may be withdrawn after the blocks are laid.

5. In combination, means for applying blocks to a fabric, with the faces of the blocks in contact with the fabric, whereby a number of blocks may be laid at once and the fabric may be withdrawn after the blocks are laid, and means for exposing said blocks for inspection before applying them to the fabric.

6. In combination, mechanism for applying a number of blocks to a strip of fabric, with the faces of the blocks in contact with the fabric, whereby a number of blocks may be laid at once and the fabric may be withdrawn after the blocks are laid, and means for exposing said blocks in their proper relative positions for inspection before applying them to the fabric.

7. In combination, means for exposing a number of blocks for inspection, and means for applying the exposed faces of the blocks to a fabric.

8. In combination, means for exposing a number of blocks for inspection loosely upon a horizontal support, and means for inverting said blocks and applying the exposed faces thereof to a fabric.

9. In combination, a number of individual chutes each of substantially the width of one block, a support receiving the blocks from the individual chutes and exposing them for inspection, and means for applying the blocks from said support to a strip of fabric.

10. In combination, a number of individual chutes each of substantially the width of one block, a support receiving the blocks in loose positions from the individual chutes, and means for packing the blocks in tight positions and applying them to a strip of fabric, with the faces of the blocks in contact with the fabric, whereby a number of blocks may be laid at once and the fabric may be withdrawn after the blocks are laid.

11. In combination, a number of individual chutes, a tray having an unobstructed floor from which the blocks are fed into the mouths of said chutes, and triangular guides between the mouths of said chutes for directing blocks one at a time from said tray into said mouths.

12. In combination, a number of individual chutes, a tray having an unobstructed floor from which the blocks are fed into the mouths of said chutes, and triangular guides between the mouths of said chutes and tapered downward at the sides for directing blocks one at a time from said tray into said mouths.

13. In combination, means for applying the faces of blocks to a fabric with adhesive, means for applying a second fabric without adhesive to the backs of said blocks, and means for forming the fabrics with the intermediate blocks into a roll.

14. A mosaic-machine including mechanism for feeding a number of blocks simultaneously in continuous adjacent lines horizontally and loosely to permit inspection and correction of inaccuracies, and feeding the corrected blocks in an inclined direction so as to pack close to each other by their weight, and means for applying the faces of the blocks to a fabric while they are packed close together.

15. A mosaic-machine including mechanism for feeding a number of blocks simultaneously in continuous substantially contacting lines, and in an inclined direction so as to pack close to each other by their weight.

16. A mosaic-machine including mechanism for feeding a number of blocks simultaneously in adjacent lines horizontally and loosely to permit inspection and correction of inaccuracies, and feeding the corrected blocks in an inclined direction so as to pack close to each other by their weight, and means for pressing the blocks together laterally while they are being fed in said inclined direction.

17. In combination, an inclined tray C, adapted to receive blocks, means for vibrating said tray laterally, and members R and S arranged to jog said tray up and down as it is vibrated.

18. In combination, a hopper carrying blocks, mechanism for feeding blocks automatically from said hopper and applying them simultaneously in adjacent lines to a fabric, means for taking up the composite product, and means for regulating the discharge from said hopper to correspond with the velocity at which the composite product is taken up.

19. In combination, means for applying blocks to an adhesive fabric and winding the same upon a drum with the blocks outward of the fabric, and means for slightly spreading the blocks of the fabric lengthwise before the product is wound.

20. In combination, means for applying blocks to an adhesive fabric, a drum H upon which the compound product is wound, and a drum j for spreading the blocks slightly upon the fabric.

21. A machine for making mosaics of contrasting blocks, including means for feeding a number of such blocks and means for automatically determining the order in which said blocks are fed.

22. A machine for making mosaics of contrasting blocks, including means for feeding a number of such blocks in a determined order, said means being adjustable to vary the order in which said blocks are fed.

23. A machine for making mosaics of contrasting blocks, including means for feeding a number of such blocks in continuous and adjacent lines simultaneously and in determined positions relative to each other.

24. A machine for making mosaics of contrasting blocks, including means for feeding a number of such blocks simultaneously in a transverse row and means for automatically determining the positions of the contrasting blocks relatively to each other.

25. A machine for making mosaics of contrasting blocks, including means for applying a number of such blocks to a fabric and means for automatically determining the order in which said blocks are applied to the fabric.

26. A machine for making mosaics of contrasting blocks, including means for feeding a number of such blocks in continuous and adjacent lines simultaneously, and applying such lines to a fabric, and means for automatically determining the positions of the contrasting blocks relatively to each other.

27. A machine for making mosaics of contrasting blocks, including in combination chutes each adapted to receive blocks of a particular color, and means for feeding blocks alternately from chutes carrying blocks of different colors.

28. A machine for making mosaics of contrasting blocks, including in combination inclined chutes each adapted to receive blocks of a particular color, escapement devices for said chutes, and means for operating alternately escapements of chutes carrying differently-colored blocks.

29. A machine for making mosaics of contrasting blocks, including in combination inclined chutes each adapted to receive blocks of a particular color, escapement devices for said chutes, and a series of tappets for operating alternately escapements of chutes carrying differently-colored blocks, said tappets being adjustable to vary the pattern.

30. A machine for making mosaics of contrasting blocks, including means for feeding a number of such blocks in a determined order, and applying them to a fabric, and means for exposing said blocks for inspection before applying them to the fabric.

31. In combination, a number of individual chutes, and a tray having an unobstructed floor from which the blocks are fed into the mouths of said chutes, the mouths of said chutes being flared to a width equal to a little less than twice the width of one of the blocks.

32. A mosaic-machine including an inclined tray for receiving blocks, in combination with means for vibrating the tray laterally and vertically to throw down the blocks which are on edge.

33. A mosaic-machine including an inclined tray having springs at its sides tending to throw the blocks toward the center of the tray.

34. A mosaic-machine including, in combination, a roller, means for feeding a strip of adhesive fabric to said roller, and a tray for feeding blocks to said roller to adhere to said fabric, said tray being pivoted with its free end adjacent to the roller.

In witness whereof I have hereunto signed my name in the presence of two subscribing witnesses.

JOHN ROYDEN PEIRCE.

Witnesses:
   Domingo A. Usina,
   Theodore T. Snell.